United States Patent [19]

Jackson

[11] Patent Number: 5,132,669
[45] Date of Patent: Jul. 21, 1992

[54] LEVEL SENSOR WITH ALARM

[76] Inventor: Ronald E. Jackson, 216 W. Southport Rd., Indianapolis, Ind. 46217

[21] Appl. No.: 584,106

[22] Filed: Sep. 18, 1990

Related U.S. Application Data

[63] Continuation-in-part of Ser. No. 342,090, Apr. 24, 1989, Pat. No. 4,987,409.

[51] Int. Cl.$^5$ .............................................. G08B 21/00
[52] U.S. Cl. .................................... 340/612; 340/617; 340/620; 73/304 R; 200/61.21
[58] Field of Search .............. 340/618, 620, 612, 617; 73/290 R, 304 R; 200/61.04, 61.05, 61.2, 61.21

[56] References Cited

U.S. PATENT DOCUMENTS

| | | | |
|---|---|---|---|
| 3,102,175 | 10/1960 | Eichenberger, Jr. | 340/617 X |
| 3,392,580 | 12/1965 | Bain et al. | 340/606 X |
| 3,757,134 | 9/1973 | Witener | 340/620 X |
| 3,786,464 | 1/1974 | Staempfli | 340/623 |
| 4,155,082 | 5/1979 | Jones et al. | 340/656 |
| 4,263,587 | 4/1981 | John | 340/620 |
| 4,600,314 | 7/1986 | Theriault | 340/628 X |

Primary Examiner—Forester W. Isen
Assistant Examiner—Jeffery A. Hofsass

[57] ABSTRACT

An alarm system for use in a salt-brine tank of a water softener has a sensor including a stem member having a lower end received in the bed of salt within the salt-brine tank and an upper end projecting above the bed of salt. An spaced pair of electrodes are supported at the stem member upper end and are responsive to direct contact with a brine solution inside the tank for generating the signal indicative of an abnormal condition. An electronic circuit is coupled to the sensor for generating an alarm which includes two counters coupled to a clock circuit such that any alarm indicative of the abnormal condition is delayed for a predetermined period of time after the sensor signals the abnormal condition, and the alarm is generated as spaced, short bursts of sound, the spacing between the bursts of sound being greater than the duration of the bursts.

14 Claims, 1 Drawing Sheet

LEVEL SENSOR WITH ALARM

CROSS-REFERENCE TO RELATED APPLICATION

This is a Continuation-In-Part of application Ser. Number 07/342,090 filed Apr. 24, 1989 now U.S. Pat. No. 4,987,409.

BACKGROUND OF THE INVENTION

The present invention relates generally to sensors including an alarm for sensing the level of pulverant material relative to the level of a liquid within the same container. The invention has particular utility with respect to sensing the level of salt within a salt-brine tank of a household water softener.

Household water softeners generally include a vessel containing an ion exchange resin intended to remove calcium and other minerals from a supply of water used within the household. From time to time, generally once every day or two, it becomes necessary to recharge the ion exchange resin so it can continue to perform its intended function. The recharging is accomplished by introducing a brine solution into the resin bed whereby a reverse ion exchange takes place freeing the calcium and other undesired ions which can then be flushed from the system and down the drain. Once the system is recharged, an amount of water is introduced into a tank containing pellet or particulate salt to form a new supply of brine for the next recharge cycle.

On introduction of the fresh water into contact with the salt, a portion of the salt dissolves in the water thereby lowering the level of the salt within the salt-brine tank. After a number of recharged cycles, it becomes necessary to add salt to the salt-brine tank. Since the recharging generally occurs automatically, a householder often gives little thought to the operation of the water softener system. Often, the householder discovers that a water softener is out of salt only when sensing that the water is no longer as soft as desired It is therefore an object of the present invention to alert a householder when the level of salt within the salt-brine tank falls below a desired minimum level and, in particular, below the maximum water level within the salt-brine tank.

On occasion, a water softener runs out of salt while the householder is absent for an extended period of time such as during a family vacation, or the like. Were an alarm system designed to sound continuously upon activation, such an extended absence might cause the battery to run down and the alarm to cease operation before the return of the householder. It is therefore an object of the Present invention to Provide an alarm which will periodically sound a short alarm over an extended period of time to alert the householder. It is a further object to minimize the current through the sensor during an alarm condition to extend battery life and to preserve sensor integrity.

SUMMARY OF THE INVENTION

In accordance with the present invention, an alarm system generally comprises a sensor which is situated on the top of a bed of pulverant material within a container. An electronic circuit is provided which includes an alarm and an input for connecting the circuit to the sensor. The sensor includes means responsive to direct contact with the liquid or brine for operating the circuit to initiate the alarm in the event that the top of the bed of pulverant material drops to a point where the salt no longer supports the sensor, or the liquid rises above the liquid sensor means. Preferably, the sensor comprises a pair of conductors having a first end connected to the input of the circuit and a second end situated on the top of the bed of pulverant material, the second end of the pair of conductors having electrodes exposed to permit direct conduction through the liquid in the event the second end becomes submerged in the liquid.

A particularly advantageous sensor for use in connection with the system comprises a stem member having a length of about 10 cm. to 20 cm. The stem member includes a lower end adapted to be received in the bed of salt and an upper end supporting the electrodes on the second end of the pair of conductors generally above the bed of salt. While the length of the stem member may be varied somewhat, it is important that the length be sufficient to maintain the electrodes on the second end of the pair of conductors normally out of contact with the salt bed by at least about seven or eight cm. so as to prevent unwanted bridging of the second end by moist salt crystals which might lead to a false alarm. Of course, in the event that the salt level falls low enough, or the brine level rises high enough, the brine will contact the upper end of the stem member and provide a conductive path between the second ends of the conductors causing the electronic circuit to initiate an alarm sequence.

A particularly advantageous electronic circuit for use in connection with the system comprises an input means for connecting the circuit to the sensor. The input means includes means for controlling the current through the sensor when the sensor is in contact with the brine. This sensor current control has the advantage of preventing electrolysis from destroying the electrodes on the second ends of the conductors and also prolongs the life of any battery powering the electronic circuit. The input means is connected to a first and a second timing means. The first timing means acts to delay the initiation of the alarm for a Period of time, typically several hours, following activation of the circuit by the sensor. This has the advantage of having the alarm delayed until the householder is no longer sleeping in view of the general practice of having such systems go through recharging cycles in the middle of the night. The second timing means acts to pattern the alarm to occur as widely spaced short bursts of sound thus having the advantage of conserving the life of the battery powering the circuit. In a preferred embodiment, the second timing means has a repeating pattern of the alarm on for about two to five seconds, off for about thirty to sixty seconds, on for about two to five seconds, and then off for about five minutes.

Additional features of the invention will become apparent to those skilled in the art upon consideration of the following detailed description of a preferred embodiment exemplifying the best mode of carrying the invention as present perceived. The detailed description Particularly refers to the accompanying figures.

DESCRIPTION OF THE PREFERRED EMBODIMENTS

Figure 1:
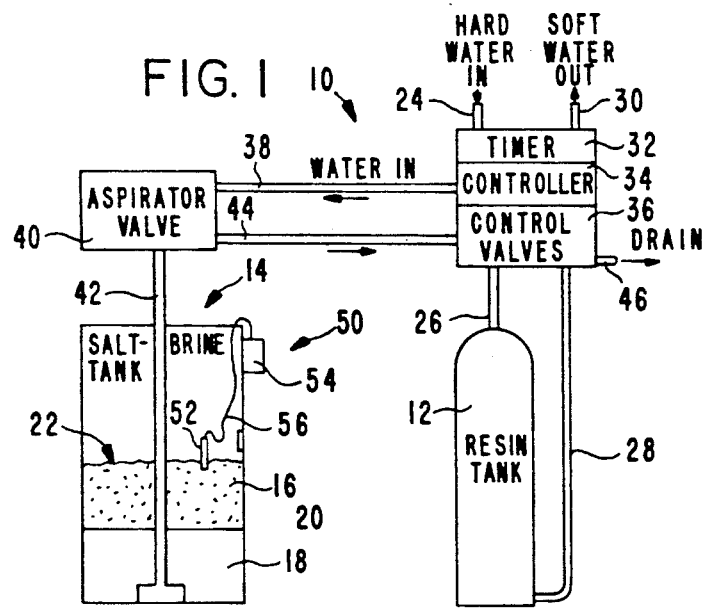
FIG. 1 is a diagrammatic view of a water softener system including an alarm system in accordance with the present invention.

A household water softening system 10 is schematically shown in FIG. 1. The system 10 includes a resin tank 12 containing an ion exchange resin and a salt-brine tank 14 which is shown to contain a bed of pulverant salt 16 and an amount of brine 18. The top surface of the brine 20 is illustrated to be below the top surface 22 of the salt which is the most desirable condition for the contents of the salt-brine tank 14. Hard water from a supply enters the water softening system 10 through conduit 24. Except during the recharge cycle, the hard water proceeds immediately through conduit 26 into the resin tank where the water intermediately contacts the ion exchange resin contained within the resin tank 12. The intimate contact of the hard water with the ion exchange resin causes the hard water to lose calcium and other ions and thereby become softened. The softened water exits the resin tank 12 through conduit 28. The soft water then proceeds in the normal course through conduit 30 for use throughout the particular household involved.

On a periodic basis, usually set by timer 32, a controller 34 causes the ion exchange resin within resin tank 12 to become recharged. This is accomplished through the use of various control valves 36. During the recharge cycle, an amount of water coming through conduit 24, is diverted to conduit 38 and through aspirator valve 40. As the water passes through aspirator valve 40, a negative pressure is created in line 42, which extends to the bottom of the salt-brine tank thereby causing brine 18 within the tank 14 to proceed upward to the aspirator valve 40 where it is mixed with the water flowing through the aspirator valve 40. The mixed water and brine then proceeds through conduit 44 into a control valve 36 where it is directed through conduit 26 into the resin tank 12. Upon introduction of the brine mixture into the resin tank 12, the ion exchange resin gives up the calcium, magnesium, and other ions which have previously been captured by the resin. These released ions then flow with the flow of water through conduit 28 to control valve 36 which directs this water through conduit 46 to a drain.

The recharge cycle may include certain backwashing steps and repetitive introductions of brine as are necessary to accomplish the desired objective of recharging the ion exchange resin. When the recharging cycle is nearly finished, an amount of soft water coming out of conduit 28 is directed by control valve 36 backwards through conduit 44 to aspirator valve 40. The aspirator valve 40 directs this reverse flow of water through conduit 42 into the salt-brine tank to fill the tank to the desired level 20. After the water has been so introduced into the salt-brine tank, the control valves 36 are again changed by controller 34 back to the original operating position. The freshly introduced quantity of water dissolves some of the salt in the tank 14 to form a new supply of brine for the next recharging cycle.

The system 10 is supplied with an alarm system 50 in accordance with the present invention. The alarm system generally comprises a sensor 52 situated in the salt-brine tank 14 partially inserted in the top 24 of the bed of salt 16. An electronic circuit 54 is shown mounted to the outside of the salt-brine tank but can be mounted at any convenient location in reasonable proximity to the salt-brine tank 14. A pair of conductors 56 connects the sensor 52 to the electronic circuit 54. The sensor 52 generally includes electrode means responsive to direct contact with the brine 18 for operating the circuit 54 to initiate the alarm in the event that top 22 of the bed of salt 16 drops below level 20 which represents the normal top level of the brine 18. The electrode means are also responsive to direct contact with the brine 18 so as to operate the circuit 54 so as to initiate the alarm in the event that the brine 18 rises above the preselected level 20 and in particular above the top 22 of the bed of salt 16.

A simple sensor can be constructed by merely Providing the pair of conductors 56 with the ends of the conductors exposed and lying on top of the bed of salt 16. The ends of the conductors 56 must be separated so that in the event that the level salt 16 within the salt-brine tank 14 should fall below the level of the brine, conduction through the brine between the ends of the two conductors can occur thereby triggering the alarm circuit. It has been found, however, that such a simple sensor occasionally causes a false alarm due to moist salt crystals bridging the space between the exposed ends of the conductors.

Figure 2:
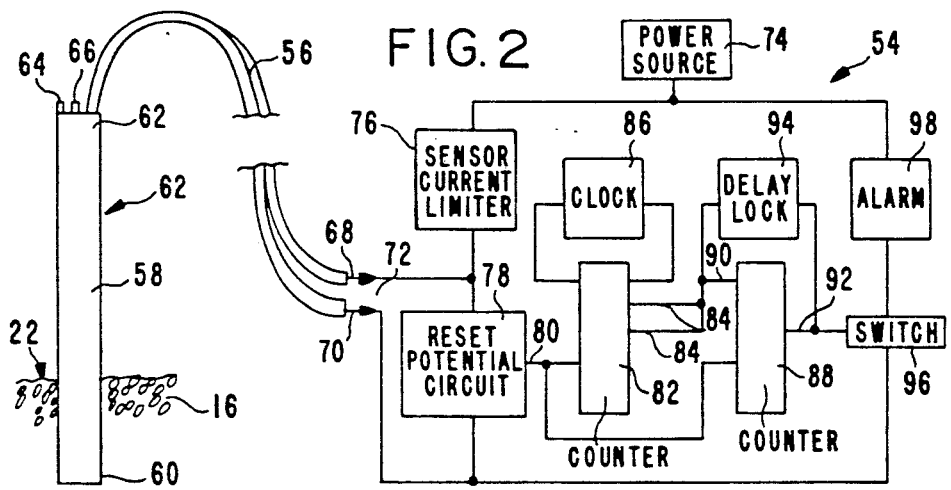
FIG. 2 is a block diagram of an alarm system and an advantageous sensor constructed in accordance with the present invention.

A particularly advantageous sensor 52 for use in connection with the system comprises a stem member 58 having a length of about 10 cm. to 20 cm. and an aspect ratio of about 5 or greater. As shown in FIG. 2, the stem member 58 includes a lower end 60 adapted to be received in the bed of salt 16 and an upper end 62 supporting electrodes 64 and 66 at the distal end of the pair of conductors 56 in spaced relation from each other and at least about 7 cm. to 10 cm. above the upper surface 22 of the bed of salt 16. While the length of the stem member 58 may be varied somewhat, it is important that the length be sufficient to maintain the electrodes 64 and 66 of the pair of conductors 56 normally out of proximity with the bed of salt 16 so as to prevent unwanted bridging of the conductor ends by moist salt crystals which might lead to a false alarm. Of course, in the event that the salt level falls low enough, or the brine level 20 rises high enough, the brine 18 will contact the upper end 62 of the stem member 58 and provide a conductive path between the ends of the pair of conductors 56. The opposite ends 68 and 70 of the pair of conductors 56 are connected to an input 72 of electronic circuit 54. Any conductive path between the electrodes 64 and 66 will cause the electronic circuit 54 to initiate an alarm sequence.

As shown in FIG. 2, the electronic circuit 54 includes a power source 74 which is, typically, a 9-volt battery. A sensor current limiter 76 is provided between the power source 74 and a Pair of conductors 56 so that when conduction occurs between electrodes 64 and 66 of the sensor 52, the current drain on the power source 74 will be minimized. A reset potential circuit 78 is provided in relation to input 72 such that the ends 68 and 70 of the pair conductors 56 are connected to opposite ends of the potential circuit. In the absence of any conduction between electrodes 64 and 66, the reset potential circuit 78 maintains a high output state. In the event of conduction between electrodes 64 and 66 of the pair of connectors 56, the output of the reset potential circuit 78 goes to a low state. The output 80 of the reset potential circuit 78 is connected to a first counter 82. The counter 82 periodically provides an output pulse at a plurality of outputs 84 based on a time constant provided by clock circuit 86.

Each output pulse provided at the outputs 84 of counter 82 is introduced into input 90 of counter 88. After a sufficient number of counts are provided to input 90, counter 88 provides an output signal at output 92 which operates delay lock circuit 94 such that subsequent signals at outputs 84 are fed directly to switch 96. In the preferred embodiment, the delay provided by counter 88 is between about 5.5 and 6 hours. The counter 82, on the other hand, provides signals at outputs 84 of identical duration, but spaced by different amounts of time. That is, each alarm signal of approximately 5 seconds duration is followed by an off-signal which is either about 40 seconds or 4.5 minutes in duration.

Once the delay lock circuit 94 has been triggered, the outputs of counter 92 are fed to switch 96 so as to cause the alarm 98 to be triggered during the short on signals at outputs 84. The switch 96 is otherwise open so that no current flows from the power source through the alarm 98 thereby preserving battery life.

Figure 3:
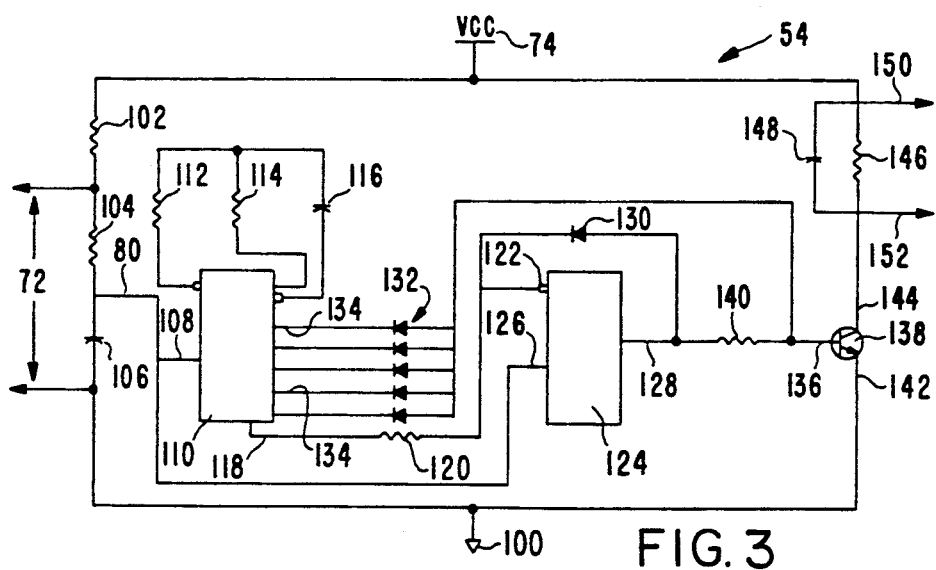
FIG. 3 is a schematic view of the electronic circuit for the alarm and sensor of the present invention.

FIG. 3 shows electronic circuit 54 in more detail. The power source 74 provides a 9-volt potential Vcc above ground 100. A resistor 102 of about 1 Meg ohm is provided to limit the current through the sensor which is coupled to sensor input 72 to less than about 10 micro Amps. The resistor 104 and capacitor 106 act together to define the potential at the reset terminal 108 of integrated circuit chip 110. Resistor 104 can have a value of about 100 K ohms, while capacitor 106 can have a value of about 0.01 mmf. A time constant for the integrated circuit chip 110 is provided by resistors 112 and 114 and capacitor 116 connected to the clock outputs and inputs of integrated circuit chip 110. Illustratively, resistor 112 can have a value of about 2 Meg ohms. Resistor 114 can have a value of about 820 K ohms. Capacitor 116 can have a value of about 0.022 mmf.

An output 118 of integrated chip 110 is connected through resistor 120 to clock input 122 of integrated circuit 124. An integrated circuit chip such as CD4060BE can be employed for both integrated circuit 110 and integrated circuit 124. The reset input 126 of integrated circuit 124 is connected to the reset input 108 of integrated circuit 110 as well as between resistor 104 and capacitor 106 of the reset potential circuit 78. The output 128 of integrated circuit 124 is coupled to the anode of diode 130 while the cathode of diode 130 is connected to the clock input 122.

The cathodes of a Plurality of diodes 132 are coupled individually to a like plurality of outputs 134 of integrated circuit 110. The anodes of all diodes 132 are tied together and are coupled to the base input 136 of switching transistor 138 which can be a MPSA25KS. The base terminal 136 is also coupled through resistor 140 to output 128 of integrated circuit 124. The resistor 140 can be about 47 K ohms. The emitter terminal 142 is connected to ground 100 while the collector terminal is connected through resistor 146 and capacitor 148 to power source 74. The resistor 146 can have a value of about 470 ohms while the capacitor can have a value of about 0.01 mmf. The resistor 146 and capacitor 148 to provide a signal to a buzzer or other sound emitting device coupled to terminals 150 and 152.

The switching transistor 138 is arranged in a common-emitter switch configuration to control the emission of any sound by the device connected between terminals 150 and 152. When the voltage level on terminal 136 is low, the transistor 138 acts as an open switch to prevent any current from flowing through resistor 146. With a voltage level on terminal 136 is high, the transistor 138 acts like a closed switch causing current to flow through resistor 146 thereby developing the voltage potential between terminals 150 and 152 necessary to power any sound emitting device coupled thereto.

In order for a high potential to develop at terminal 136 of resistor 138, it is necessary for a high Potential to develop at output 128 of integrated circuit 124 and at all of the outputs 118 and 134 of integrated circuit 110. If any of the outputs 118, 128 or 134 are low, a conduction path is provided through either diode 130 and/or diode 132 sufficient to cause the base 136 of the transistor 138 to remain low.

For output 128 of integrated circuit 124 to get to a high state, it is necessary that the clock input 122 receive a sufficient number of signals through resistor 120 from output 118 of integrated circuit 110. Each high state achieved at output 118 of integrated circuit 110 is maintained for only a short period of time determined by the RC time constant of capacitor 116 and resistor 114. Once a high state is achieved at terminal 128, that high state is maintained by the high signal applied through diode 130 to input terminal 122 of integrated circuit 124 unless and until a reset signal is received at input 126. As indicated previously, such a reset signal is only achieved when the Potential at output 80 goes to a high state. So long as there is conduction occurring at a sensor connected to input 72, the potential at output 80 remains low.

Conduction through a sensor connected to input 72 removes any reset signal from reset inputs 108 and 126 of integrated circuits 110 and 124, respectively, thereby initiating the counting sequence provided by the circuit. First, the integrated circuit 110 provides a series of signals to input 122 to integrated circuit 124. After about 5 to 6 hours, the output 128 of integrated circuit 124 goes to a high state. Thereafter, each time all the outputs of integrated circuit 110 achieve a high state, transistor 138 is caused to act as a closed switch thereby causing the alarm device to sound for the short period of time of a few seconds..

The practical utility for the 5 to 6 hour delay will be appreciated when one considers that the recharging of the system typically occurs during periods of minimum water use such as some time between 1:00 A.M. and 5:00 A.M. On the other hand, the owner of such an alarm would probably prefer to not be awakened in the middle of the night by the alarm just because the salt level is a little too low. Thus the time delay is to permit the alarm to sound at a more reasonable time following the triggering event.

Although the invention has been described in detail with reference to the preferred embodiments, variations and modifications exist within the scope and spirit of the invention as described and defined in the following claims.

What is claimed is:

1. An alarm system for use in a salt-brine tank of a water softener, the alarm system comprising:
an alarm means for generating an alarm, sensing means for sensing an abnormal condition inside the tank and supplying a signal to the alarm indicative of the abnormal condition, coupling means for coupling the sensing means to the alarm, the coupling means including means for delaying intiation of the alarm for a predetermined period of time after the sensing means signals the abnormal condition, the sensing means including support member having a lower end received in the bed of salt supporting said support member in a generally vertical orientation, so that a major portion of said support member extends above the salt bed, whereby said support member becomes increasingly unstable with a decreasing thickness of said salt bed as it is dissolved by the introduction of fresh water into said tank, and an upper end projecting above the bed of salt, and means supported at the support member upper end a distance away from moist salt crystals emanating from said bed, and which is unresponsive to said moist salt crystals, but responsive to direct contact with a brine solution inside the tank for providing a closed circuit through said brine solution for generating the signal indicative of the abnormal condition thereby initiating the alarm.

2. The alarm system of claim 1 wherein the sensing means comprises a pair of conductors having a first end connected to the coupling means and a second end situated at the top of the support member upper end.

3. The alarm system of claim 2 wherein the sensing means further comprises a conductivity sensing means located at the second end of the conductors for sensing the electrical conductivity of the environment immediately surrounding the second end of the conductors.

4. The alarm system of claim 3 wherein the conductivity sensing means further comprises a pair of electrodes fixed to the second end of the conductors for sensing the electrical conductivity of the environment immediately surrounding the second end of the conductors.

5. The alarm system of claim 1 wherein the alarm includes time spacing means for spacing the generation of the alarm to occur as spaced, short bursts of sound, the spacing between the bursts of sound being greater than the duration of the bursts.

6. The alarm system of claim 1 wherein each support member has a length of about 10 cm to about 20 cm.

7. An alarm system for use in a slat-brine tank of a water softener, the alarm system comprising:
an alarm means for generating an alarm, sensing means for sensing an abnormal condition inside the tank and supplying a signal to the alarm indicative of the abnormal condition, coupling means for coupling the sensing means to the alarm, the coupling means including means for delaying initiation of the alarm for a predetermined period of time after the sensing means signals the abnormal condition, the sensing means including a support member having a lower end received in the bed of salt which supports a majority of said support member generally vertically above said bed of salt, and an upper end projecting above the bed of salt and electrode means supported at the support member upper end for forming a circuit through said brine solution upon contact for generating the signal indicative of the abnormal condition, thereby initiating the alarm, and said electrode being unresponsive to moist salt crystals above said bed of salt in the absence of said brine solution.

8. The alarm system of claim 7 wherein the sensing means comprises a pair of conductors having a first end connected to the coupling means and a second end situated at the top of the support member upper end, and a pair of electrodes located at the second end of the conductors for sensing the electrical conductivity of the environment immediately surrounding the second end of the conductors.

9. The alarm system of claim 7 wherein the support member has a length greater than about 10 cm., and an aspect ratio greater than about five, so that the support provided by the support member becomes increasingly unstable with decreasing thickness of the salt bed as it is dissolved by the introduction of fresh water into the salt-brine tank.

10. The alarm system of claim 7 wherein the generation of the alarm produces bursts of sound such that, for each two consecutive spacings between the bursts of sound, a first spacing is several times the length of a second spacing.

11. The alarm system of claim 7 further comprising a power source and a sensor current limit means between the sensing means and the alarm means so that, when conduction occurs at the electrode means, current drain on the power source and electrolysis of the electrodes will be minimized.

12. An alarm system for use in a salt-brine tank of a water softener, the alarm system comprising:
an alarm means for generating an alarm, sensing means for sensing an abnormal condition inside the tank and supplying a signal to the alarm indicative of the abnormal condition, coupling means for coupling the sensing means to the alarm, the coupling means including means for delaying initiation of the alarm for a predetermined period of time after the sensing means signals the abnormal condition, wherein said sensing means further comprises a support member having a lower end received in the bed of salt supporting a major portion of said support member, including an upper end generally vertically above the bed of salt, and means supported at the support member upper end and responsive to direct contact with a brine solution for generating the signal indicative of the abnormal condition, thereby initiating the alarm, as said bed of salt dissolves.

13. The alarm system of claim 12 wherein the alarm provides bursts of sound such that, for consecutive spacings between the bursts of sound, a first spacing is several times the length of a second spacing.

14. The alarm system of claim 13 wherein following initiation of the alarm, the alarm is sounded only periodically for a few seconds and made to remain silent for much longer periods to preserve the life of the source of power for the system.

* * * * *